(12) United States Patent
Agarwal

(10) Patent No.: US 7,498,401 B2
(45) Date of Patent: Mar. 3, 2009

(54) THERMOPLASTIC POLYCARBONATE COMPOSITIONS, ARTICLES MADE THEREFROM AND METHOD OF MANUFACTURE

(75) Inventor: Naveen Agarwal, Evansville, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 623 days.

(21) Appl. No.: 11/071,840

(22) Filed: Mar. 3, 2005

(65) Prior Publication Data
US 2006/0199879 A1    Sep. 7, 2006

(51) Int. Cl.
C08G 64/00    (2006.01)
C08G 63/02    (2006.01)

(52) U.S. Cl. ............... 528/201; 428/411.1; 428/412; 525/67; 525/101; 525/133; 525/148; 525/464; 528/196; 528/198

(58) Field of Classification Search ............. 264/176.1, 264/219; 524/423, 431, 447, 449, 451, 503; 428/411.1, 412; 525/67, 101, 133, 148, 464; 528/196, 198, 201
See application file for complete search history.

(56) References Cited

U.S. PATENT DOCUMENTS

| | | | |
|---|---|---|---|
| 3,130,177 A | 4/1964 | Grabowski | 260/45.5 |
| 3,511,895 A | 5/1970 | Kydonieus et al. | |
| 3,635,895 A | 1/1972 | Kramer | 260/47 XA |
| 3,686,355 A | 8/1972 | Gaines, Jr. et al. | 260/824 R |
| 3,981,944 A | 9/1976 | Okamoto et al. | |
| 4,154,775 A | 5/1979 | Axelrod | |
| 4,217,438 A | 8/1980 | Brunelle et al. | 528/202 |
| 4,238,597 A | 12/1980 | Markezich et al. | 528/179 |
| 4,304,709 A | 12/1981 | Salee | 260/40 R |
| 4,305,856 A | 12/1981 | Sakano et al. | 260/29.1 SB |
| 4,357,271 A | 11/1982 | Rosenquist | |
| 4,555,310 A | 11/1985 | Marrelli | |
| 4,555,384 A | 11/1985 | Morris et al. | 422/109 |
| 4,569,970 A | 2/1986 | Paul et al. | |
| 4,600,632 A | 7/1986 | Paul et al. | 428/220 |
| 4,654,400 A | 3/1987 | Lohmeijer et al. | 525/64 |
| 4,657,972 A | 4/1987 | Giles, Jr. et al. | |
| 4,740,538 A | 4/1988 | Sekutowski | |
| 4,746,701 A | 5/1988 | Kress et al. | |
| 4,767,818 A | 8/1988 | Boutni | 524/505 |
| 4,777,212 A | 10/1988 | Kress et al. | 525/67 |
| 4,788,252 A | 11/1988 | de Boer et al. | 525/67 |
| 4,927,880 A | 5/1990 | DeRudder et al. | 525/63 |
| 4,994,532 A | 2/1991 | Hawkins et al. | |
| 5,023,297 A | 6/1991 | Boutni | |
| 5,091,461 A | 2/1992 | Skochdopole | |
| 5,109,076 A | 4/1992 | Freitag et al. | 525/464 |
| 5,126,428 A | 6/1992 | Freitag et al. | 528/196 |
| 5,266,618 A | 11/1993 | Watanabe et al. | 524/405 |
| 5,322,882 A | 6/1994 | Okamoto | 524/537 |
| 5,326,834 A | 7/1994 | Sauers et al. | 525/534 |
| 5,360,861 A | 11/1994 | Campbell | 524/494 |
| 5,380,795 A | 1/1995 | Gosens et al. | |
| 5,391,600 A | 2/1995 | Umeda et al. | 524/267 |
| 5,391,603 A | 2/1995 | Wessel et al. | 524/396 |
| 5,397,822 A | 3/1995 | Lee, Jr. | |
| 5,399,644 A | 3/1995 | Silva et al. | |
| 5,414,045 A | 5/1995 | Sue et al. | |
| 5,430,121 A | 7/1995 | Pudleiner et al. | 528/28 |
| 5,455,310 A | 10/1995 | Hoover et al. | |
| 5,488,086 A | 1/1996 | Umeda et al. | 525/92 A |
| 5,530,083 A | 6/1996 | Phelps et al. | 528/25 |
| 5,571,851 A | 11/1996 | Freeman et al. | |
| 5,602,201 A | 2/1997 | Fujiguchi et al. | |
| 5,608,026 A | 3/1997 | Hoover et al. | 528/445 |
| 5,616,674 A | 4/1997 | Michel et al. | 528/29 |
| 5,714,537 A | 2/1998 | Laughner et al. | |
| 5,723,541 A | 3/1998 | Ingenito et al. | 525/92 |
| 5,770,652 A | 6/1998 | Richards et al. | |
| 5,859,119 A | 1/1999 | Hoefflin | 524/494 |
| 5,965,655 A | 10/1999 | Mordecai et al. | |
| 6,001,929 A | 12/1999 | Nodera et al. | 525/92 E |
| 6,072,011 A | 6/2000 | Hoover | |
| 6,252,013 B1 | 6/2001 | Banach et al. | |
| 6,306,507 B1 | 10/2001 | Brunelle et al. | 428/423.7 |
| 6,376,605 B1 | 4/2002 | Sugimoto et al. | 525/67 |

(Continued)

FOREIGN PATENT DOCUMENTS

DE    4016417 A1    11/1991

(Continued)

OTHER PUBLICATIONS

Standard Test Method for High Speed Puncture Properties of Plastics Using Load and Displacement Sensors, D 3763-02 Copyright ASTM International.

(Continued)

Primary Examiner—Terressa M Boykin

(57) ABSTRACT

A thermoplastic composition, contains a polycarbonate resin, a polycarbonate-polysiloxane copolymer, an aromatic vinyl copolymer, an impact modifier, and a mineral filler, wherein the composition has least about 40% ductility under multiaxial impact strength test conditions per ASTM D3763 at −30° C. Alternatively, a composition contains a polycarbonate resin, a polycarbonate-polysiloxane copolymer in an amount sufficient to provide at least about 2.5 wt. % siloxane by weight of the composition, an aromatic vinyl copolymer comprising SAN, an impact modifier comprising ABS, and a mineral filler. Such compositions may be made by combining, by weight of the composition, polycarbonate resin, a polycarbonate-polysiloxane copolymer, an aromatic vinyl copolymer, an impact modifier, and a mineral filler, wherein the composition has at least 40% ductility under multiaxial impact strength test conditions per ASTM D3763 at −30° C. An article may be made from such a composition, optionally by molding, shaping or forming the composition to form the article.

22 Claims, No Drawings

U.S. PATENT DOCUMENTS

| | | | |
|---|---|---|---|
| 6,391,965 B1 | 5/2002 | Koura et al. | 525/52 |
| 6,545,089 B1 | 4/2003 | DeRudder et al. | 525/63 |
| 6,576,706 B1 | 6/2003 | Nodera et al. | 525/67 |
| 6,596,794 B1 | 7/2003 | Eckel et al. | |
| 6,613,820 B2 | 9/2003 | Fujiguchi et al. | |
| 6,657,018 B1 | 12/2003 | Hoover | 525/464 |
| 6,676,852 B2 | 1/2004 | Brown et al. | |
| 6,727,319 B2 | 4/2004 | Eichenauer | 525/66 |
| 6,833,422 B2 | 12/2004 | Silva et al. | |
| 6,870,013 B2 | 3/2005 | Silva et al. | |
| 7,365,125 B2 * | 4/2008 | Govaerts et al. | 525/67 |
| 2003/0092837 A1 | 5/2003 | Eichenauer | 525/71 |
| 2003/0105226 A1 | 6/2003 | Cella et al. | 525/67 |
| 2003/0119986 A1 | 6/2003 | Eichenauer | 525/71 |
| 2003/0139504 A1 | 7/2003 | Miebach et al. | |
| 2003/0191245 A1 | 10/2003 | Nodera et al. | 525/100 |
| 2003/0191250 A1 | 10/2003 | Seidel et al. | |
| 2004/0011999 A1 | 1/2004 | Murray | |
| 2004/0039145 A1 | 2/2004 | Silva et al. | 528/25 |
| 2004/0220330 A1 | 11/2004 | Derudder et al. | |
| 2005/0032988 A1 | 2/2005 | Silva et al. | |
| 2005/0148719 A1 | 7/2005 | An et al. | |
| 2006/0014919 A9 | 1/2006 | Venderbosch et al. | |
| 2006/0030647 A1 | 2/2006 | Ebeling et al. | |

FOREIGN PATENT DOCUMENTS

| | | |
|---|---|---|
| DE | 40 24 667 A1 | 2/1992 |
| EP | 0 186 917 A2 | 10/1985 |
| EP | 0206006 A1 | 6/1986 |
| EP | 0 247 430 A2 | 5/1987 |
| EP | 0 248 308 A2 | 5/1987 |
| EP | 0 254 054 B1 | 6/1987 |
| EP | 0 281 837 A2 | 2/1988 |
| EP | 0 283 776 A2 | 3/1988 |
| EP | 0 369 200 A2 | 10/1989 |
| EP | 0 376 052 B1 | 12/1989 |
| EP | 0 387 570 B1 | 2/1990 |
| EP | 0 434 848 B1 | 7/1990 |
| EP | 0 517 927 A1 | 12/1991 |
| EP | 0 522 753 A2 | 6/1992 |
| EP | 0 524 731 B1 | 6/1992 |
| EP | 0 595 187 B1 | 10/1993 |
| EP | 0 600 196 B1 | 10/1993 |
| EP | 0 628 600 B1 | 5/1994 |
| EP | 0595141 | 5/1994 |
| EP | 0 635 547 A2 | 7/1994 |
| EP | 0 645 422 A1 | 8/1994 |
| EP | 0 692 522 B1 | 6/1995 |
| EP | 0 707 045 A2 | 10/1995 |
| EP | 0520186 | 12/1997 |
| EP | 1 162 235 B1 | 12/1999 |
| EP | 1162235 | 12/2003 |
| EP | 1331246 | 5/2007 |
| WO | WO 80/00084 | 1/1980 |
| WO | WO 84/04318 A1 | 11/1984 |
| WO | WO 86/00083 | 1/1986 |
| WO | WO 01/72905 A2 | 10/2001 |
| WO | WO 03/025060 A1 | 3/2003 |
| WO | WO 03/025061 A2 | 3/2003 |
| WO | WO 2004/076541 A2 | 9/2004 |
| WO | WO 2005/037921 A1 | 4/2005 |
| WO | WO2005/075568 A2 | 5/2005 |
| WO | WO 2005/075549 A1 | 8/2005 |

OTHER PUBLICATIONS

Standard Test Method for Melt Flow Rates of Thermoplastics by Extrusion Plastomert, D 1238-01, Copyright ASTM.
Standard Test Methods for Determining the Ixod Pendulum Impact Resistance of Plastics, D 256-04, Copyright ASTM.
Standard Test Method for High Speed Puncture Properties of Plastics Using Load and Displacement Sensors, D 3763-99, Copyright ASTM.
DE4016417. "Polycarbonate flame retardant alloys-contain copolymer, graft polymer and poly:organo:siloxane-polycarbonate block copolymer, for good mechanical properties". Publication date: Nov. 28, 1991. (Abstract Only).
EP0387570. "Blends of polydiorganosiloxane-polycarbonate-block cocondensates with elastomeric polymerisation products". Publication Date: Sep. 19, 1990. (Abstract Only).
JP04-225062. Publication Date: Aug. 14, 1992. (Abstract Only).
JP05-156170. Publication Date: Jun. 22, 1993. (Abstract Only).
EP0206006 A1. "Thermoplastic moulding compositions having a part strength of their coalescence seams". Publication Date: Dec. 30, 1986. (Abstract Only).
EP0247430A2. "Flame-retarding thermoplastic moulding composition . . . ". Publication Date: Dec. 2, 1987. (Abstract Only).
EP0248308A2. "Moulding compounds with easy mould releasability . . . ". Publication date: Dec. 9, 1987. (Abstract only).
JP05-255583. Publication Date: Oct. 5, 1993. (Abstract Only).
JP 05-311075. Publication Date Nov. 22, 1993. (Abstract Only).
JP 06-184424. Publication Date Jul. 5, 1994 (Abstract Only).
JP06-212070. Publication Date: Aug. 2, 1994. (Abstract Only).
JP06-228424. Publication Date: Aug. 16, 1994. (Abstract Only).
JP 08-269314. Publication Date: Oct. 15, 1996. (Abstract Only).
JP09-040856. Publication Date: Feb. 10, 1997. (Abstract Only).
JP56014549. Publication date: Jul. 12, 1979. (Abstract Only).
JP58011540. Publication Date: Jan. 22, 1983. (Abstract Only).
EP0707045A2. "Flame resistant thermoplastic polycarbonate moulding compositions". Publication Date: Apr. 17, 1996. (Abstract Only).
European Search Report for EP05254891. Mailed Nov. 15, 2005.
European Search Report for EP05255053. Mailed Nov. 28, 2005.
JP06322545A2. "Plated Resin Product". Publication Date: Nov. 22, 1994. (Abstract Only).
JP07082467. Date of Filing: Sep. 16, 1993 (Abstract Only).
International Search Report for International Application No. PCT/US2005/044519, mailed Nov. 5, 2006.
International Search Report for International Application No. PCT/US2005/035432 mailed Mar. 2, 2006.
International Search Report for International Application No. PCT/US2006/007372, mailed Jul. 19, 2006, 6 pages.

* cited by examiner

THERMOPLASTIC POLYCARBONATE COMPOSITIONS, ARTICLES MADE THEREFROM AND METHOD OF MANUFACTURE

BACKGROUND

This invention is directed to thermoplastic compositions comprising aromatic polycarbonate, and in particular impact-modified thermoplastic polycarbonate compositions having improved stability.

Aromatic polycarbonates are useful in the manufacture of articles and components for a wide range of applications, from automotive parts to electronic appliances.

U.S. Pat. No. 5,380,795 discloses a polymer mixture comprising polycarbonate, a styrene-containing copolymer and/or graft copolymer, and a polycarbonate-polysiloxane copolymer. No examples with mineral fillers are disclosed and there is no teaching on how to incorporate fillers and maintain ductility.

There is a need for mineral-filled thermoplastic compositions containing polycarbonate that have low coefficients of thermal expansion, good impact strength and/or good ductility.

SUMMARY OF THE INVENTION

A thermoplastic composition, comprises a polycarbonate resin, a polycarbonate-polysiloxane copolymer, an aromatic vinyl copolymer, an impact modifier, and a mineral filler, wherein the composition has least about 40% ductility under multiaxial impact strength test conditions per ASTM D3763 at −30° C.

In another embodiment, a thermoplastic composition comprises a polycarbonate resin, a polycarbonate-polysiloxane copolymer in an amount sufficient to provide at least about 2.5 wt. % siloxane by weight of the composition, an aromatic vinyl copolymer comprising styrene-acrylonitirile copolymer (SAN), an impact modifier comprising acrylonitrile-butadiene-styrene copolymer (ABS), and a mineral filler.

A method for making a thermoplastic composition comprises combining, by weight of the composition, polycarbonate resin, a polycarbonate-polysiloxane copolymer, an aromatic vinyl copolymer, an impact modifier, and a mineral filler, wherein the composition has at least 40% ductility under multiaxial impact strength test conditions per ASTM D3763 at −30° C.

An article may be made from such compositions, optionally in a method comprising molding, shaping or forming the composition to form the article.

DETAILED DESCRIPTION OF THE INVENTION

A thermoplastic composition comprising a polycarbonate resin, a polycarbonate-polysiloxane copolymer, aromatic vinyl copolymer, an impact modifier and a mineral filler is described herein. Such compositions have been found to exhibit good physical properties, such as impact resistance, tensile strength, modulus, etc., providing combinations of properties that are difficult to attain in mineral-filled polycarbonate-containing thermoplastic materials.

As used herein, the terms "polycarbonate" and "polycarbonate resin" mean compositions having repeating structural carbonate units of formula (1):

in which at least about 60 percent of the total number of $R^1$ groups are aromatic organic radicals and the balance thereof are aliphatic, alicyclic, or aromatic radicals. In one embodiment each $R^1$ is an aromatic organic radical and, more specifically, a radical of formula (2):

$$-A^1-Y^1-A^2- \qquad (2)$$

wherein each of $A^1$ and $A^2$ is a monocyclic divalent aryl radical and $Y^1$ is a bridging radical having one or two atoms that separates $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

$$HO-A^1-Y^1-A^2-OH \qquad (3)$$

wherein $Y^1$, $A^1$ and $A^2$ are as described above. Also included are bisphenol compounds of general formula (4):

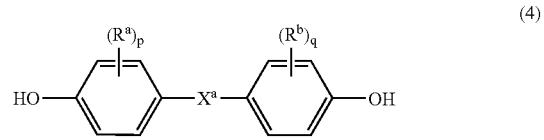

wherein $R^a$ and $R^b$ each represent a halogen atom or a monovalent hydrocarbon group and may be the same or different; p and q are each independently integers of 0 to 4; and $X^a$ represents one of the groups of formula (5):

wherein $R^c$ and $R^d$ each independently represent a hydrogen atom or a monovalent linear or cyclic hydrocarbon group and Re is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-

(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

A nonexclusive list of specific examples of the types of bisphenol compounds that may be represented by formula (3) includes 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

Branched polycarbonates are also useful, as well as blends comprising a linear polycarbonate and a branched polycarbonate. The branched polycarbonates may be prepared by adding a branching agent during polymerization, for example a polyfunctional organic compound containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents may be added at a level of about 0.05 wt. % to about 2.0 wt. %. All types of polycarbonate end groups are contemplated as being useful in the polycarbonate composition, provided that such end groups do not significantly affect desired properties of the thermoplastic compositions.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the exemplary phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$ wherein X is Cl$^-$, Br$^-$, a $C_{1-8}$ alkoxy group or $C_{6-188}$ aryloxy group. An effective amount of a phase transfer catalyst may be about 0.1 wt. % to about 10 wt. % based on the weight of bisphenol in the phosgenation mixture. In another embodiment an effective amount of phase transfer catalyst may be about 0.5 wt. % to about 2 wt. % based on the weight of bisphenol in the phosgenation mixture.

Alternatively, melt processes may be used. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst. Volatile monohydric phenol is removed from the molten reactants by distillation and the polymer is isolated as a molten residue.

"Polycarbonate" and "polycarbonate resin" as used herein further include copolymers comprising carbonate chain units together with a different type of chain unit. Such copolymers may be random copolymers, block copolymers, dendrimers or the like. One specific type of copolymer that may be used is a polyester carbonate, also known as a copolyester-polycarbonate. Such copolymers further contain, in addition to recurring carbonate chain units of the formula (1), repeating units of formula (6)

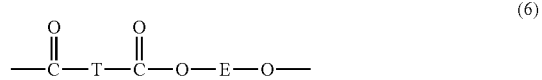

(6)

wherein E is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 carbon atoms to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, E is a $C_{2-6}$ alkylene radical. In another embodiment, E is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is preferably bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, E is a $C_{2-6}$ alkylene radical and T is p-phenylene, m-phenylene, naphthalene, a divalent cycloaliphatic radical, or a mixture thereof. This class of polyester includes the poly(alkylene terephthalates).

In one specific embodiment, the polycarbonate is a linear homopolymer derived from bisphenol A, in which each of $A^1$ and $A^2$ is p-phenylene and $Y^1$ is isopropylidene.

The polycarbonates may have an intrinsic viscosity, as determined in chloroform at 25° C., of about 0.3 deciliters per gram (dl/gm) to about 1.5 dl/gm, specifically about 0.45 dl/gm to about 1.0 dl/gm. The polycarbonates may have a weight average molecular weight of about 10,000 grams per mole (g/mol) to about 200,000 g/mol, specifically about 20,000 g/mol to about 100,000 g/mol as measured by gel permeation chromatography.

The copolyester-polycarbonate resins are also prepared by interfacial polymerization. Rather than using the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, and mixtures thereof, it is possible to employ isophthaloyl dichloride, terephthaloyl dichloride, and mixtures thereof.

In one embodiment, the polycarbonate is based on Bisphenol A, and may have a molecular weight of 10,000 g/mol to 120,000 g/mol, more specifically 18,000 g/mol to 40,000 g/mol (on an absolute molecular weight scale). Such polycarbonate materials are available from GE Advanced Materials under the trade name LEXAN. The initial melt flow of such polycarbonates may be about 6 grams flow per 10 minutes (g/10 min) to about 65 g/10 min flow, per ASTM 1238, measured at 300° C. using a 1.2 Kg load.

The polycarbonate component may further comprise, in addition to the polycarbonates described above, combinations of the polycarbonates with other thermoplastic polymers, for example combinations of polycarbonate homopolymers and/or copolymers with polyesters. As used herein, a "combination" is inclusive of all mixtures, blends, alloys, and the like. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end-use of the composition.

In one embodiment, poly(alkylene terephthalates) are used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated herein are the above polyesters with a minor amount, e.g., from about 0.5 wt. % to about 10 wt. %, of units derived from an aliphatic diacid and/or an aliphatic polyol to make copolyesters.

The blends of a polycarbonate and a polyester may comprise about 10 wt. % to about 99 wt. % polycarbonate and correspondingly about 1 wt. % to about 90 wt. % polyester, in particular a poly(alkylene terephthalate). In one embodiment, the blend comprises about 30 wt. % to about 70 wt. % polycarbonate and correspondingly about 30 wt. % to about 70 wt. % polyester. The foregoing amounts are based on the combined weight of the polycarbonate and polyester.

Although blends of polycarbonates with other polymers are contemplated, in various embodiments the polycarbonate resin, when blended with the other components of the compositions described herein, may contain polycarbonate homopolymers and/or polycarbonate copolymers and may be substantially free of polyester and, optionally, free of other types of polymeric materials blended with the polycarbonate composition.

The composition further comprises a polycarbonate-polysiloxane copolymer comprising polycarbonate blocks and polydiorganosiloxane blocks. The polycarbonate blocks in the copolymer comprise repeating structural units of formula (1) as described above, for example wherein $R^1$ is of formula (2) as described above. These units may be derived from reaction of dihydroxy compounds of formula (3) as described above. In one embodiment, the dihydroxy compound is bisphenol A, in which each of $A^1$ and $A^2$ is p-phenylene and $Y^1$ is isopropylidene.

The polydiorganosiloxane blocks comprise repeating structural units of formula (8) (sometimes referred to herein as 'siloxane'):

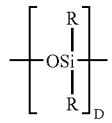

(8)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

The value of D in formula (8) may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (9):

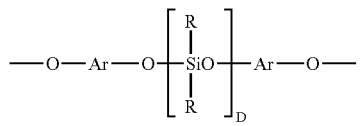

(9)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Such units may be derived from the corresponding dihydroxy compound of the following formula:

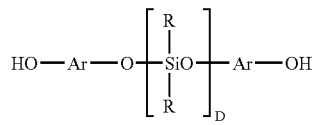

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (10)

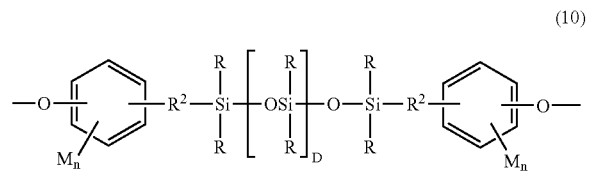

(10)

wherein R and D are as defined above. $R^2$ in formula (10) is a divalent $C_2$-$C_8$ aliphatic group. Each M in formula (9) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (11):

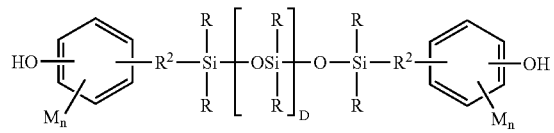

(11)

wherein R, D, M, $R^2$, and n are as described above.

Such dihydroxy polysiloxanes can be made by effecting a platinum catalyzed addition between a siloxane hydride of the formula (12),

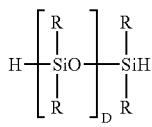

(12)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polycarbonate-polysiloxane copolymer may be manufactured by reaction of diphenolic polysiloxane (11) with a carbonate source and a dihydroxy aromatic compound of formula (3), optionally in the presence of a phase transfer catalyst as described above. Suitable conditions are similar to those useful in forming polycarbonates. For example, the copolymers are prepared by phosgenation, at temperatures from below 0° C. to about 100° C., preferably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, i.e., may be about 1 wt. % to about 99 wt. % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt. % to about 75 wt. %, or about 1 wt. % to about 50 wt. % polydimethylsiloxane, or an equivalent molar amount of another polydiorganosiloxane. In one embodiment, the copolymer comprises about 5 wt. % to about 40 wt. %, optionally about 5 wt. % to about 25 wt. % polydimethylsiloxane, or an equivalent molar amount of another polydiorganosiloxane, with the balance being polycarbonate. In a particular embodiment, the copolymer may comprise about 20 wt. % siloxane.

The polycarbonate-polysiloxane copolymers have a weight-average molecular weight (MW, measured, for example, by gel permeation chromatography, ultra-centrifugation, or light scattering) of about 10,000 g/mol to about 200,000 g/mol, specifically about 20,000 g/mol to about 100,000 g/mol.

It is the siloxane component of the polycarbonate-polysiloxane copolymer that is believed to yield the superior ductility characteristics demonstrated in the Examples below. Accordingly, the quantity of polycarbonate-polysiloxane copolymer in the composition may be selected to provide a desired siloxane content in the composition. For example, to achieve at least 1 wt. % siloxane in the composition using a polycarbonate-polysiloxane copolymer containing 20 wt. % siloxane, the composition may comprise at least 5 wt. % by weight of the polycarbonate-polysiloxane copolymer, or at least 10 wt. % of a polycarbonate-polysiloxane copolymer containing only 10 wt. % siloxane in the copolymer, etc. In various embodiments, the composition may comprise at least about 1 wt. % siloxane, optionally at least 1.3 wt. % siloxane, to provide low temperature (e.g., −30° C. or −40° C.) ductility. In other embodiments, the composition may comprise at least about 2 wt. % siloxane, optionally at least 2.5 wt. % siloxane or, optionally, about 5 wt. % siloxane or more, for ductility at low temperatures. In still other embodiments, the composition may comprise 1 to 15 wt. % or 2 to 9 wt. % or, optionally, 1 to 5 wt. % polydimethyl siloxane units or the equivalent molar amount of other polydiorgano siloxane units ("siloxane") calculated with respect to the weight of the total composition.

The amount of polycarbonate in the composition will vary according to the quantity of the other components, especially the polycarbonate-polysiloxane copolymer, so that when more polycarbonate-polysiloxane copolymer is used, less polycarbonate may be used. For example, to provide a selected siloxane content in a composition, less of a high siloxane-content polycarbonate-polysiloxane copolymer is needed than of a low-siloxane content copolymer, so polycarbonate may constitute a larger proportion in the former case than in the latter, other components optionally being unchanged. For example, a composition may comprise 75 wt. % polycarbonate resin and 10 wt. % of a polycarbonate-polysiloxane copolymer comprising about 20 wt. % siloxane and 80 wt. % polycarbonate groups in the copolymer, providing 2 wt. % siloxane in the composition and 8 wt. % polycarbonate groups in addition to the 75 wt. % polycarbonate for a total of 83 wt. % polycarbonate component in the composition. Another composition containing 83 wt. % polycarbonate component and 2 wt. % siloxane may comprise 65 wt. % polycarbonate resin and 20 wt. % of a polycarbonate-polysiloxane copolymer comprising 10 wt. % siloxane and 90 wt. % polycarbonate groups in the copolymer.

The composition includes an aromatic vinyl copolymer comprising (a) an aromatic vinyl monomer component and (b) a cyanide vinyl monomer component. Examples of (a) the aromatic vinyl monomer component include a-methylstyrene, o-, m-, or p-methylstyrene, vinyl xylene, monochlorostyrene, dichlorostyrene, monobromostyrene, dibromostyrene, fluorostyrene, p-tert-butylstyrene, ethylstyrene, and vinyl naphthalene, and these substances may be used individually or in combinations of two or more, with a-methylstyrene being preferred. Examples of (b) the cyanide vinyl monomer component include acrylonitrile and methacrylonitrile, and these may be used individually or in combinations of two or more. There are no particular restrictions on the composition ratio thereof, and this ratio should be selected according to the application in question. There are no particular restrictions on the composition ratio of (a) to (b) in the aromatic vinyl copolymer. Optionally, the aromatic vinyl copolymer may comprise 95 to 50 wt. % (a) and 5 to 50 wt. % (b), optionally 92 to 65 wt. % (a) and 8 to 35 wt. % (b).

The weight average molecular weight (Mw) of the aromatic vinyl copolymer may be 30,000 to 200,000, optionally 30,000 to 110,000 being preferred.

There are no particular restrictions on the method of manufacturing the aromatic vinyl copolymer, and any commonly-known method may be used, such as bulk polymerization, solution polymerization, bulk suspension polymerization, suspension polymerization, and emulsion polymerization. Moreover, the individually copolymerized resins may also be blended.

Methods for manufacturing the aromatic vinyl copolymer include bulk polymerization, solution polymerization, and bulk suspension polymerization. The alkali metal content of the aromatic vinyl copolymer should be 1 ppm or less, and preferably 0.5 ppm or less, with a content of 0.1 ppm or less being particularly preferred. Moreover, among alkali metals, the content of sodium and potassium in component (B) should be 1 ppm or less, and preferably 0.5 ppm or less, with a content of 0.1 ppm or less being particularly preferred.

The composition may comprise about 2 wt. % to about 25 wt. % aromatic vinyl copolymer, optionally about 2 wt. % to about 20 wt. % aromatic vinyl copolymer, for example, about 5 wt. % to about 15 wt. % aromatic vinyl copolymer or, optionally, about 7.5 wt. % to about 10 wt. % aromatic vinyl copolymer, as shown in the examples herein. In one embodiment, the aromatic vinyl copolymer comprises "free" styrene-acrylonitrile copolymer (SAN), i.e., styrene-acrylonitrile copolymer that is not grafted onto another polymeric chain. A free styrene-acrylonitrile copolymer may have a molecular weight of 50,000 to about 200,000 on a polystyrene standard molecular weight scale and may comprise various proportions of styrene to acrylonitrile. For example, free SAN may comprise about 75 wt. % styrene and about 25 wt. % acrylonitrile based on the total weight of the free SAN copolymer. Free SAN may optionally be present by virtue of the addition of a grafted rubber impact modifier in the composition that contains free SAN, or free SAN may by present independent of the impact modifier in the composition.

The composition also comprises an impact modifier, which may be present in amounts up to about 15 wt. % of the composition, e.g. about 0.1 wt. % to about 15 wt. %, optionally 2 wt. % to about 10 wt. %.

In one embodiment, the impact modifier may comprise a graft polymer having a high rubber content, i.e., greater than 50 wt. %, preferably greater than about 60 wt. % by weight. The rubber is preferably present in an amount less than about 95 wt. %, preferably less than about 90 wt. % of the graft polymer.

The rubber forms the backbone of the graft polymer, and is preferably a polymer of a conjugated diene having the formula (13):

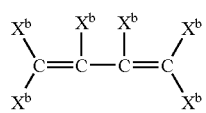

wherein $X^b$ is hydrogen, $C_1$-$C_5$ alkyl, chlorine, or bromine. Examples of dienes that may be used are butadiene, isoprene, 1,3-hepta-diene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures comprising at least one of the foregoing dienes, and the like. A preferred conjugated diene is butadiene. Copolymers of conjugated dienes with other monomers may also be used, for example copolymers of butadiene-styrene, butadiene-acrylonitrile, and the like.

Alternatively, the backbone may be an acrylate rubber, such as one based on n-butyl acrylate, ethylacrylate, 2-ethylhexylacrylate, mixtures comprising at least one of the foregoing, and the like. Additionally, minor amounts of a diene may be copolymerized in the acrylate rubber backbone to yield improved grafting.

After formation of the backbone polymer, a grafting monomer is polymerized in the presence of the backbone polymer. One preferred type of grafting monomer is a monovinylaromatic hydrocarbon having the formula (14):

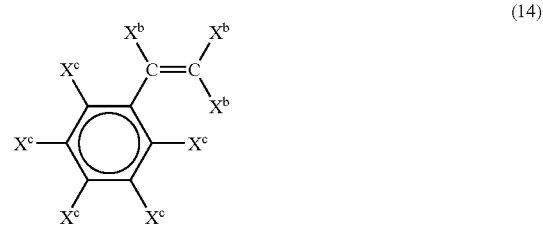

wherein $X^b$ is as defined above and $X^c$ is hydrogen, $C_1$-$C_{10}$ alkyl, $C_1$-$C_{10}$ cycloalkyl, $C_1$-$C_{10}$ alkoxy, $C_6$-$C_{18}$ alkyl, $C_6$-$C_{18}$ aralkyl, $C_6$-$C_{18}$ aryloxy, chlorine, bromine, and the like. Examples include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, mixtures comprising at least one of the foregoing compounds, and the like. The preferred monovinylaromatic hydrocarbons are styrene and/or alpha-methylstyrene.

A second type of grafting monomer that may be polymerized in the presence of the polymer backbone are acrylic monomers of formula (15):

wherein $X^b$ is as previously defined and $Y^2$ is cyano, $C_1$-$C_{12}$ alkoxycarbonyl, or the like. Examples of such acrylic monomers include acrylonitrile, ethacrylonitrile, methacrylonitrile, alpha-chloroacrylonitrile, beta-chloroacrylonitrile, alpha-bromoacrylonitrile, beta-bromoacrylonitrile, methyl acrylate, methyl methacrylate, ethyl acrylate, butyl acrylate, propyl acrylate, isopropyl acrylate, mixtures comprising at least one of the foregoing monomers, and the like. Preferred monomers include acrylonitrile, ethyl acrylate, and methyl methacrylate.

A mixture of grafting monomers may also be used, to provide a graft copolymer. Preferred mixtures comprise a monovinylaromatic hydrocarbon and an acrylic monomer. Preferred graft copolymers include acrylonitrile-butadiene-styrene (ABS) and methacrylonitrile-butadiene-stryrene (MBS) resins. Suitable high-rubber acrylonitrile-butadienestyrene resins are available from General Electric Company as BLENDEX® grades 131, 336, 338, 360, and 415.

The preparation of such impact modifiers is well-known in the art.

In one embodiment, the impact modifier comprises acrylonitrile-butadiene-styrene (ABS). The ABS may be of a kind prepared by an emulsion process, as is known in the art, or by a bulk polymerization process, also known in the art. Preferably, the ABS is substantially free of compounds that degrade polycarbonates. Use of such an impact modifier can provide thermoplastic compositions having excellent physical properties (i.e., low temperature impact resistance and thermal stability) as well as good hydrolytic stability.

Bulk polymerized ABS (sometimes designated BABS), which may also be used as an impact modifier, comprises an elastomeric phase comprising (i) butadiene and having a Tg of less than about 10° C., and (ii) a rigid polymeric phase comprising a copolymer of a monovinylaromatic monomer such as styrene and an unsaturated nitrile such as acrylonitrile. Such ABS polymers may be prepared by first providing the elastomeric polymer, then polymerizing the constituent monomers of the rigid phase in the presence of the elastomer to obtain the graft copolymer. The grafts may be attached as graft branches or as shells to an elastomer core. The shell may merely physically encapsulate the core, or the shell may be partially or substantially completely grafted to the core.

Polybutadiene homopolymer may be used as the elastomer phase. Alternatively, the elastomer phase of the bulk polymerized ABS comprises butadiene copolymerized with up to about 25 wt. % of another conjugated diene monomer of formula (16):

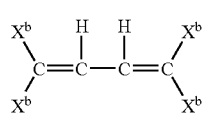

(16)

wherein each $X^b$ is independently $C_1$-$C_5$ alkyl. Examples of conjugated diene monomers that may be used are isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. A specific conjugated diene is isoprene.

The elastomeric butadiene phase may additionally be copolymerized with up to 25 wt. %, specifically up to about 15 wt. %, of another comonomer, for example monovinylaromatic monomers containing condensed aromatic ring structures such as vinyl naphthalene, vinyl anthracene and the like, or monomers of formula (17):

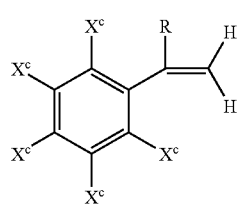

(17)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers copolymerizable with the butadiene include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing monovinylaromatic monomers. In one embodiment, the butadiene is copolymerized with up to about 12 wt. % styrene and/or alpha-methyl styrene.

Other monomers that may be copolymerized with the butadiene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (18):

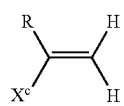

(18)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (18) include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the butadiene.

The particle size of the butadiene phase is not critical, and may be, for example about 0.01 micrometers (μm) to about 20 μm, specifically about 0.5 μm to about 10 μm, more specifically about 0.6 μm to about 1.5 μm may be used for bulk polymerized rubber substrates. Particle size may be measured by light transmission methods or capillary hydrodynamic chromatography (CHDF). The butadiene phase may provide about 5 wt. % to about 95 wt. % of the total weight of the ABS impact modifier copolymer, more specifically about 20 wt. % to about 90 wt. %, and even more specifically about 40 wt. % to about 85 wt. % of the ABS impact modifier, the remainder being the rigid graft phase.

The rigid graft phase comprises a copolymer formed from a styrenic monomer composition together with an unsaturated monomer comprising a nitrile group. As used herein, "styrenic monomer" includes monomers of formula (18) wherein each $X^c$ is independently hydrogen, $C_1$-$C_4$ alkyl, phenyl, $C_7$-$C_9$ aralkyl, $C_7$-$C_9$ alkaryl, $C_1$-$C_4$ alkoxy, phenoxy, chloro, bromo, or hydroxy, and R is hydrogen, $C_1$-$C_2$ alkyl, bromo, or chloro. Specific examples styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like. Combinations comprising at least one of the foregoing styrenic monomers may be used.

Further as used herein, an unsaturated monomer comprising a nitrile group includes monomers of formula (18)

wherein R is hydrogen, $C_1$-$C_5$ alkyl, bromo, or chloro, and $X^c$ is cyano. Specific examples include acrylonitrile, ethacrylonitrile, methacrylonitrile, alpha-chloroacrylonitrile, beta-chloroacrylonitrile, alpha-bromoacrylonitrile, and the like. Combinations comprising at least one of the foregoing monomers may be used.

The rigid graft phase of the bulk polymerized ABS may further optionally comprise other monomers copolymerizable therewith, including other monovinylaromatic monomers and/or monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (18). Specific comonomers include $C_1$-$C_4$ alkyl (meth)acrylates, for example methyl methacrylate.

The rigid copolymer phase will generally comprise about 10 wt. % to about 99 wt. %, specifically about 40 wt. % to about 95 wt. %, more specifically about 50 wt. % to about 90 wt. % of the styrenic monomer; about 1 wt. % to about 90 wt. %, specifically about 10 wt. % to about 80 wt. %, more specifically about 10 wt. % to about 50 wt. % of the unsaturated monomer comprising a nitrile group; and 0 wt. % to about 25 wt. %, specifically 1 wt. % to about 15 wt. % of other comonomer, each based on the total weight of the rigid copolymer phase.

The bulk polymerized ABS copolymer may further comprise a separate matrix or continuous phase of ungrafted ("free") rigid copolymer that may be simultaneously obtained with the ABS. The ABS may comprise about 40 wt. % to about 95 wt. % elastomer-modified graft copolymer and about 5 wt. % to about 65 wt. % rigid copolymer, based on the total weight of the ABS. In another embodiment, the ABS may comprise about 50 wt. % to about 85 wt. %, more specifically about 75 wt. % to about 85 wt. % elastomer-modified graft copolymer, together with about 15 wt. % to about 50 wt. %, more specifically about 15 wt. % to about 25 wt. % rigid copolymer, based on the total weight of the ABS. When the rigid copolymer comprises free SAN, the total SAN in the composition may be about 25 wt %.

A variety of bulk polymerization methods for ABS-type resins are known. In multizone plug flow bulk processes, a series of polymerization vessels (or towers) consecutively connected to each other provides multiple reaction zones. The elastomeric butadiene may be dissolved in one or more of the monomers used to form the rigid phase, and the elastomer solution is fed into the reaction system. During the reaction, which may be thermally or chemically initiated, the elastomer is grafted with the rigid copolymer (i.e., SAN). Bulk copolymer (referred to also as free copolymer, matrix copolymer, or non-grafted copolymer) is also formed within the continuous phase containing the dissolved rubber. As polymerization continues, domains of free copolymer are formed within the continuous phase of rubber/comonomers to provide a two-phase system. As polymerization proceeds, and more free copolymer is formed, the elastomer-modified copolymer starts to disperse itself as particles in the free copolymer and the free copolymer becomes a continuous phase (phase inversion). Some free copolymer is generally occluded within the elastomer-modified copolymer phase as well. Following the phase inversion, additional heating may be used to complete polymerization. Numerous modifications of this basis process have been described, for example in U.S. Pat. No. 3,511,895, which describes a continuous bulk ABS process that provides controllable molecular weight distribution and microgel particle size using a three-stage reactor system. In the first reactor, the elastomer/monomer solution is charged into the reaction mixture under high agitation to precipitate discrete rubber particle uniformly throughout the reactor mass before appreciable cross-linking can occur. Solids levels of the first, the second, and the third reactor are carefully controlled so that molecular weights fall into a desirable range. U.S. Pat. No. 3,981,944 discloses extraction of the elastomer particles using the styrenic monomer to dissolve/disperse the elastomer particles, prior to addition of the unsaturated monomer comprising a nitrile group and any other comonomers. U.S. Pat. No. 5,414,045 discloses reacting in a plug flow grafting reactor a liquid feed composition comprising a styrenic monomer composition, an unsaturated nitrile monomer composition, and an elastomeric butadiene polymer to a point prior to phase inversion, and reacting the first polymerization product (grafted elastomer) therefrom in a continuous-stirred tank reactor to yield a phase inverted second polymerization product that then can be further reacted in a finishing reactor, and then devolatilized to produce the desired final product. In various embodiments, the bulk polymerized ABS (BABS) may contain a nominal 15 wt. % butadiene and a nominal 15 wt. % acrylonitrile. The microstructure is phased inverted, with occluded SAN in a butadiene phase in a SAN matrix. The BABS may be manufactured using a plug flow reactor in series with a stirred, boiling reactor as described, for example, in U.S. Pat. No. 3,981,944 and U.S. Pat. No. 5,414,045.

As indicated above, various additives known to those of skill in the art may be added to these compositions, and mixtures of additives may be used. Such additives include fillers, reinforcing agents, pigments, antioxidants, heat and color stabilizers, light stabilizers, etc. Additives may be added at a suitable time during the mixing of the components for forming the composition. Preferably, each additive is substantially free of compounds that cause polymer degradation, or that generate degradative material, upon hydrolytic aging in the composition.

Suitable fillers or reinforcing agents include mineral fillers, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene (PTFE) and the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

Fillers and reinforcing agents may be coated with a layer of metallic material to facilitate conductivity, or treated with silanes, e.g., to improve adhesion and/or dispersion with the polymeric matrix resin. Such silane-treated mineral fillers are known in the art. See, for example, U.S. Pat. No. 4,357,271, which teaches that silane-treated filler may comprise 0.5% to 2% of the filler, by weight. See also, U.S. Pat. Nos. 5,571,851 and 4,740,538. A variety of such fillers are commercially available, for example, Huber Engineered Materials offers amino silane treated kaolin clay under the designation Nulok™ 390, mercaptosilane treated kaolin clays (available in several different grades) under the designation Nucap™, silane treated alumina trihydrate under the designation Hymod™, and surface treated magnesium hydroxide, under the designation Zerogen™; Engelhard Corporation offers surface treated kaolin clays from under the trade designation Translink® 390; Specialty Minerals, Inc. offers silane treated talc under the trade designations 9102-S and 9103-S; Luzenac Group offers silane-treated talc under the designation Mistron® talc; and Kobo Products Inc. offers various silane treated iron oxides, titanium dioxide, mica and talc.

In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are sometimes used in amounts of about 0 parts by weight to about 40 parts by weight, based on 100 parts by weight of the polycarbonate resin and the impact modifier composition, if any.

The compositions described herein may comprise a primary antioxidant or "stabilizer" (e.g., a hindered phenol and/or secondary aryl amine) and, optionally, a secondary antioxidant (e.g., a phosphate and/or thioester). Preferably, the antioxidant is one that does not promote hydrolysis. For example, stabilizers that become inactive, or change form, after hydrolytic aging are suitable, whereas stabilizers that generate degradation catalysts after hydrolytic exposure are not suitable. Examples of unsuitable stabilizers would be phosphites that generate acidic species upon hydrolysis in a PC/ABS blend. Suitable antioxidant additives include, for example, alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; or the like; or combinations comprising at least one of the foregoing antioxidants. Antioxidants are generally used in amounts of about 0.01 parts by weight to about 1 part by weight, specifically about 0.1 parts by weight to about 0.5 parts by weight, based on 100 parts by weight of polycarbonate component and any impact modifier.

Suitable heat and color stabilizer additives include, for example, organophosphites such as tris(2,4-di-tertbutyl phenyl) phosphite. Heat and color stabilizers are generally used in amounts of about 0.01 parts by weight to about 5 parts by weight, specifically about 0.05 parts by weight to about 0.3 parts by weight, based on 100 parts by weight of polycarbonate component and any impact modifier.

Suitable secondary heat stabilizer (antioxidant) additives include, for example thioethers and thioesters such as pentaerythritol tetrakis (3-(dodecylthio)propionate), pentaerythritol tetrakis[3-(3,5-di-tert-butyl-4-hydroxyphenyl)propionate], dilauryl thiodipropionate, distearyl thiodipropionate, dimyristyl thiodipropionate, ditridecyl thiodipropionate, penterythritol octylthiopropionate, dioctadecyl disulphide, or the like, or combinations comprising at least one of the foregoing heat stabilizers. Secondary stabilizers are generally used in amount of about 0.01 parts by weight to about 5 parts by weight, specifically about 0.03 parts by weight to about 0.3 parts by weight, based upon 100 parts by weight of polycarbonate component and any impact modifier.

Light stabilizers, including ultraviolet light (UV) absorbing additives, may also be used. Suitable stabilizing additives of this type include, for example, benzotriazoles and hydroxybenzotriazoles such as 2-(2-hydroxy-5-methylphenyl)benzotriazole, 2-(2-hydroxy-5-tert-octylphenyl)-benzotriazole, 2-(2H-benzotriazol-2-yl)-4-(1,1,3,3-tetramethylbutyl)-phenol (CYASORB 5411 from Cytec), and TINUVIN 234 from Ciba Specialty Chemicals; hydroxybenzotriazines; hydroxyphenyl-triazine or—pyrimidine UV absorbers such as TINUVIN 1577 (Ciba), and 2-[4,6-bis(2,4-dimethylphenyl)-1,3,5-triazin-2-yl]-5-(octyloxy)-phenol (CYASORB 1164 from Cytec); non-basic hindered amine light stabilizers (hereinafter "HALS"), including substituted piperidine moieties and oligomers thereof, for example 4-piperidinol derivatives such as TINUVIN 622 (Ciba), GR-3034, TINUVIN 123, and TINUVIN 440; benzoxazinones, such as 2,2'-(1,4-phenylene)bis(4H-3,1-benzoxazin-4-one) (CYASORB UV-3638); hydroxybenzophenones such as 2-hydroxy-4-n-octyloxybenzophenone (CYASORB 531); oxanilides; cyanoacrylates such as 1,3-bis[[(2-cyano-3,3-diphenylacryloyl)oxy]-2,2-bis[[(2-cyano-3,3-diphenylacryloyl)oxy]methyl]propane (UVINUL 3030) and 1,3-bis[[(2-cyano-3,3-diphenylacryloyl)oxy]-2,2-bis[[(2-cyano-3,3-diphenylacryloyl)oxy]methyl]propane; and nano-size inorganic materials such as titanium oxide, cerium oxide, and zinc oxide, all with particle size less than about 100 nanometers; and the like, and combinations comprising at least one of the foregoing stabilizers. Light stabilizers may be used in amounts of about 0.01 parts by weight to about 10 parts by weight, specifically about 0.1 parts by weight to about 1 parts by weight, based on 100 parts by weight of polycarbonate and impact modifier. UV absorbers are generally used in amounts of about 0.1 parts by weight to about 5 parts by weight, based on 100 parts by weight of the polycarbonate component and the impact modifier composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like; and poly alpha olefins such as Ethylflo™ 164, 166, 168, and 170. Such materials are generally used in amounts of about 0.1 parts by weight to about 20 parts by weight, specifically about 1 part by weight to about 10 parts by weight, based on 100 parts by weight of the polycarbonate component and the impact modifier composition.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments may be coated to prevent reactions with the matrix or may be chemically passivated to neutralize catalytic degradation site that might promote hydrolytic or thermal degradation. Pigments are generally used in amounts of about 0.01 part by weight to about 10 parts by weight, based on 100 parts by weight of polycarbonate resin and any impact modifier.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes; thioindigoid dyes; diazonium dyes; nitro dyes; quinone imine dyes; aminoketone dyes; tetrazolium dyes; thiazole dyes; perylene dyes; perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 5-amino-9-diethyliminobenzo (a)phenoxazonium perchlorate; 7-amino-4-methylcarbostyryl; 7-amino-4-methylcoumarin; 7-amino-4-trifluoromethylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenylyl)-5-phenyl-1,3,4-oxadiazole; 2-(4-biphenyl)-6-phenylbenzoxazole-1,3; 2,5-bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 1,1'-diethyl-4,4'-carbocyanine iodide; 3,3'-diethyl-4,4',5,5'-dibenzothiatricarbocyanine iodide; 1,1'-diethyl-4,4'-dicarbocyanine iodide; 1,1'-diethyl-2,2'-dicarbocyanine iodide; 3,3'-diethyl-9,11-neopentylenethiatricarbocyanine iodide; 1,3'-diethyl-4,2'-quinolyloxacarbocyanine iodide; 1,3'-diethyl-4,2'-quinolylthiacarbocyanine iodide; 3-diethylamino-7-diethyliminophenoxazonium perchlorate; 7-diethylamino-4-methylcoumarin; 7-diethylamino-4-trifluoromethylcoumarin; 7-diethylaminocoumarin; 3,3'-diethyloxadicarbocyanine iodide; 3,3'-diethylthiacarbocyanine iodide; 3,3'-diethylthiadicarbocyanine iodide; 3,3'-diethylthiatricarbocyanine iodide; 4,6-dimethyl-7-ethylaminocoumarin; 2,2'-dimethyl-p-quaterphenyl; 2,2-dimethyl-p-terphenyl; 7-dimethylamino-1-methyl-4-methoxy-8-azaquinolone-2; 7-dimethylamino-4-methylquinolone-2; 7-dimethylamino-4-trifluoromethylcoumarin; 2-(4-(4-dimethylaminophenyl)-1,3-butadienyl)-3-ethylbenzothiazolium perchlorate; 2-(6-(p-dimethylaminophenyl)-2,4-neopentylene-1,3,5-hexatrienyl)-3-methylbenzothiazolium perchlorate; 2-(4-(p-dimethylaminophenyl)-1,3-butadienyl)-1,3,3-trimethyl-3H-indolium perchlorate; 3,3'-dimethyloxatricarbocyanine iodide; 2,5-diphenylfuran; 2,5-diphenyloxazole; 4,4'-diphenylstilbene; 1-ethyl-4-(4-(p-dimethylaminophenyl)-1,3-butadienyl)-pyridinium perchlorate; 1-ethyl-2-(4-(p-dimethylaminophenyl)-1,3-butadienyl)-pyridinium perchlorate; 1-ethyl-4-(4-(p-dimethylaminophenyl)-1,3-butadienyl)-quinolium perchlorate; 3-ethylamino-7-ethylimino-2,8-dimethylphenoxazin-5-ium perchlorate; 9-ethylamino-5-ethylamino-10-methyl-5H-benzo(a) phenoxazonium perchlorate; 7-ethylamino-6-methyl-4-trifluoromethylcoumarin; 7-ethylamino-4-trifluoromethylcoumarin; 1,1',3,3,3', 3'-hexamethyl-4,4',5,5'-dibenzo-2,2'-indotricarboccyanine iodide; 1,1',3,3,3',3'-hexamethylindodicarbocyanine iodide; 1,1',3,3,3',3'-hexamethylindotricarbocyanine iodide; 2-methyl-5-t-butyl-p-quaterphenyl; N-methyl-4-trifluoromethylpiperidino-<3,2-g>coumarin; 3-(2'-N-methylbenzimidazolyl)-7-N,N-diethylaminocoumarin; 2-(1-naphthyl)-5-phenyloxazole; 2,2'-p-phenylen-bis(5-phenyloxazole); 3,5, 3'''',5''''-tetra-t-butyl-p-sexiphenyl; 3,5,3'''',5''''-tetra-t-butyl-p-quinquephenyl; 2,3,5,6-1H,4H-tetrahydro-9-acetylquinolizino-<9,9a,1-gh>coumarin; 2,3,5,6-1H,4H-tetrahydro-9-carboethoxyquinolizino-<9,9a,1-gh>coumarin; 2,3,5,6-1H,4H-tetrahydro-8-methylquinolizino-<9,9a,1-gh>coumarin; 2,3,5,6-1H,4H-tetrahydro-9-(3-pyridyl)-quinolizino-<9,9a,1-gh>coumarin; 2,3,5,6-1H,4H-tetrahydro-8-trifluoromethylquinolizino-<9, 9a,1-gh>coumarin; 2,3,5,6-1H,4H-tetrahydroquinolizino-<9,9a,1-gh>coumarin; 3,3',2'',3'''-tetramethyl-p-quaterphenyl; 2,5,2'''',5'''-tetramethyl-p-quinquephenyl; P-terphenyl; P-quaterphenyl; nile red; rhodamine 700; oxazine 750; rhodamine 800; IR 125; IR 144; IR 140; IR 132; IR 26; IR5;

diphenylhexatriene; diphenylbutadiene; tetraphenylbutadiene; naphthalene; anthracene; 9,10-diphenylanthracene; pyrene; chrysene; rubrene; coronene; phenanthrene or the like, or combinations comprising at least one of the foregoing dyes. Dyes are generally used in amounts of about 0.1 parts per million to about 10 parts by weight, based on 100 parts by weight of polycarbonate resin and any impact modifier.

Monomeric, oligomeric, or polymeric antistatic additives that may be sprayed onto the article or processed into the thermoplastic composition may be advantageously used. Examples of monomeric antistatic agents include long chain esters such as glycerol monostearate, glycerol distearate, glycerol tristearate, and the like, sorbitan esters, and ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate and the like, fluorinated alkylsulfonate salts, betaines, and the like. Combinations of the foregoing antistatic agents may be used. Exemplary polymeric antistatic agents include certain polyetheresters, each containing polyalkylene glycol moieties such as polyethylene glycol, polypropylene glycol, polytetramethylene glycol, and the like. Such polymeric antistatic agents are commercially available, and include, for example PELESTAT 6321 (Sanyo), PEBAX MH1657 (Atofina), and IRGASTAT P18 and P22 (Ciba-Geigy). Other polymeric materials that may be used as antistatic agents are inherently conducting polymers such as polythiophene (commercially available from Bayer), which retains some of its intrinsic conductivity after melt processing at elevated temperatures. In one embodiment, carbon fibers, carbon nanofibers, carbon nanotubes, carbon black or any combination of the foregoing may be used in a polymeric resin containing chemical antistatic agents to render the composition electrostatically dissipative. Antistatic agents are generally used in amounts of about 0.1 part by weight to about 10 parts by weight, based on 100 parts by weight of the polycarbonate component and the impact modifier composition.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4'-oxybis(benzenesulfonylhydrazide), sodium bicarbonate, ammonium carbonate, or the like, or combinations comprising at least one of the foregoing blowing agents. Blowing agents are generally used in amounts of about 0.5 part by weight to about 20 parts by weight, based on 100 parts by weight of polycarbonate component and the impact modifier composition.

Flame retardants often used with polycarbonate compositions may be included in, or excluded from, the compositions described herein. Such flame retardants may be organic compounds that include phosphorus, bromine, and/or chlorine. However, the polycarbonate-polysiloxane copolymers described above may be used in any case, and are not included among the flame retardants that might be excluded from the compositions described herein.

Among the flame retardants that might be included in other embodiments of compositions described herein are organic phosphate compounds such as an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other aromatic phosphate flame retardants include, for example, phenyl bis(dodecyl)phosphate, phenyl bis(neopentyl)phosphate, phenyl bis (3,5,5'-trimethylhexyl)phosphate, ethyl diphenyl phosphate, 2-ethylhexyl di(p-tolyl)phosphate, bis(2-ethylhexyl) p-tolyl phosphate, tritolyl phosphate, bis(2-ethylhexyl)phenyl phosphate, tri(nonylphenyl)phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds may also be used as flame retardants, including compounds of the following formulas:

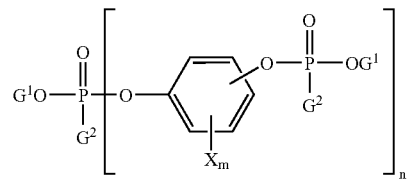

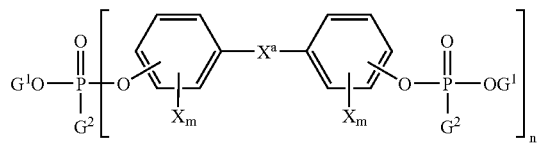

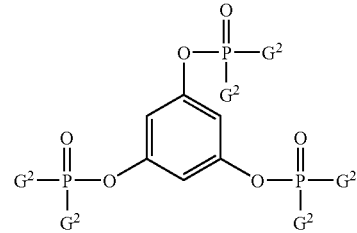

wherein each $G^1$ is independently a hydrocarbon having 1 carbon atom to about 30 carbon atoms; each $G^2$ is independently a hydrocarbon or hydrocarbonoxy having 1 carbon atom to about 30 carbon atoms; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Other such flame retardant compounds containing phosphorus-nitrogen bonds include phosphonitrilic chloride, phosphoric acid amides, phosphonic acid amides, phosphinic acid amides, tris(aziridinyl) phosphine oxide. When present, phosphorus-containing flame retardants are generally present in amounts of about 1 part by weight to about 20 parts by weight, based on 100 parts by weight of polycarbonate component and the impact modifier composition.

Halogenated materials may also be used as flame retardants, for example halogenated compounds and resins of the formula (19):

(19)

wherein R is an alkylene, alkylidene or cycloaliphatic linkage, e.g., methylene, propylene, isopropylidene, cyclohexylene, cyclopentylidene, or the like; an oxygen ether, carbonyl, amine, or a sulfur containing linkage, e.g., sulfide, sulfoxide, sulfone, or the like; or two or more alkylene or alkylidene linkages connected by such groups as aromatic, amino, ether, carbonyl, sulfide, sulfoxide, sulfone, or the like groups; Ar and Ar' are each independently a mono- or polycarbocyclic aromatic group such as phenylene, biphenylene, terphenylene, naphthylene, or the like, wherein hydroxyl and Y substituents on Ar and Ar' can be varied in the ortho, meta or para positions on the aromatic rings and the groups can be in any possible geometric relationship with respect to one another; each Y is independently an organic, inorganic or organometallic radical, for example (1) a halogen such as chlorine, bromine, iodine, or fluorine, (2) an ether group of the general formula —OE, wherein E is a monovalent hydrocarbon radical similar to X, (3) monovalent hydrocarbon groups of the type represented by R or (4) other substituents, e.g., nitro, cyano, and the like, said substituents being substantially inert provided there be at least one and preferably two halogen atoms per aryl nucleus; each X is independently a monovalent $C_{1-18}$ hydrocarbon group such as methyl, propyl, isopropyl, decyl, phenyl, naphthyl, biphenyl, xylyl, tolyl, benzyl, ethylphenyl, cyclopentyl, cyclohexyl, or the like, each optionally containing inert substituents; each d is independently 1 to a maximum equivalent to the number of replaceable hydrogens substituted on the aromatic rings comprising Ar or Ar'; each e is independently 0 to a maximum equivalent to the number of replaceable hydrogens on R; and each a, b, and c is independently a whole number, including 0, with the proviso that when b is 0, either a or c, but not both, may be 0, and when b is not 0, neither a nor c may be 0.

Included within the scope of the above formula are bisphenols of which the following are representative: bis(2,6-dibromophenyl)methane; 1,1-bis-(4-iodophenyl)ethane; 2,6-bis(4,6-dichloronaphthyl)propane; 2,2-bis(2,6-dichlorophenyl)pentane; bis(4-hydroxy-2,6-dichloro-3-methoxyphenyl)methane; and 2,2-bis(3-bromo-4-hydroxyphenyl)propane. Also included within the above structural formula are 1,3-dichlorobenzene, 1,4-dibrombenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like. Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally used in amounts of about 1 part by weight to about 50 parts by weight, based on 100 parts by weight of polycarbonate component and the impact modifier composition.

Inorganic flame retardants are also known, for example, salts of $C_{2-16}$ alkyl sulfonates such as potassium perfluorobutane sulfonate (Rimar salt), potassium perfluorooctane sulfonate, tetraethylammonium perfluorohexane sulfonate, and potassium diphenylsulfone sulfonate; salts such as $CaCO_3$, $BaCO_3$, and $BaCO_3$; salts of fluoro-anion complexes such as $Li_3AlF_6$, $BaSiF_6$, $KBF_4$, $K_3AlF_6$, $KAlF_4$, $K_2SiF_6$, and $Na_3AlF_6$; and the like. When present, inorganic flame retardant salts are generally present in amounts of about 0.01 parts by weight to about 25 parts by weight, more specifically about 0.1 parts by weight to about 10 parts by weight, based on 100 parts by weight of polycarbonate component and the impact modifier composition.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents are generally used in amounts of about 0.1 part by weight to about 10 parts by weight, based on 100 parts by weight of polycarbonate component and the impact modifier composition.

The thermoplastic compositions may be manufactured by methods generally available in the art, for example, in one embodiment, in one manner of proceeding, powdered polycarbonate, polycarbonate-polysiloxane copolymer, optional impact modifier, and any other optional components are first blended, optionally with chopped glass strands or other fillers in a Henschel™ high speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The additives may be added to either the polycarbonate base materials or the impact modifier to make a concentrate, before this is added to the final product. The extruder is generally operated at a temperature higher than that necessary to cause the composition to flow, typically 500° F. (260° C.) to 650° F. (343° C.), preferably 500° F. (260° C.) to 575° F. (300° C.), e.g., 525° F. (275° C.) to 550° F. (288° C.). The extrudate is immediately quenched in a water batch and pelletized. The pellets, prepared by cutting the extrudate, may be about one-fourth inch long or less as desired. Such pellets may be used for subsequent molding, shaping, or forming into a variety of useful articles by processes known in the art for the manufacture of articles from thermoplastic compositions.

In a particular embodiment employing a polycarbonate-polysiloxane copolymer containing about 20 wt. % siloxane, a thermoplastic composition may comprise 50 to 85 wt. % polycarbonate resin and about 10 wt. % to about 25 wt. % polycarbonate-polysiloxane copolymer, for example, about 12.5 wt % to about 20 wt. % polycarbonate-polysiloxane copolymer. Such compositions therefore comprise about 2 wt. % to about 5 wt. % siloxane, optionally about 1.3 wt. % to about 5 wt. % siloxane, or about 3.9 wt. % to about 5 wt. % siloxane, optionally about 4 wt. % to about 5 wt. % siloxane. The composition may also comprise about 2 wt. % to about 25 wt. % SAN, about 0.1 wt. % to about 15 wt. % of an impact modifier, and about 2 wt. % to about 25 wt. % silane-treated mineral filler. In various optional aspects, the mineral filler may comprise about 2 wt. % to about 20 wt. %, for example, about 5 wt. % to about 15 wt. % of the composition. In a particular embodiment, a thermoplastic composition may comprise about 50 wt. % polycarbonate, about 20 wt. % polycarbonate-polysiloxane copolymer, about 5 wt. % impact modifier and about 10 wt. % silane-treated talc.

In some embodiments, a composition may comprise about 2 wt. % to about 25 wt. % aromatic vinyl copolymer, about 0.1 wt. % to about 15 wt. % impact modifier and about 2 wt. % to about 20 wt. % silane-treated mineral filler, by weight of the composition.

Optionally, the composition may consist essentially of the polycarbonate resin, the polycarbonate-polysiloxane copolymer, the aromatic vinyl copolymer, the impact modifier and the filler, to the exclusion of phosphate and sulfonate flame retardants and any ingredients that defeat the improved low-temperature ductility of the compositions demonstrated in the Examples herein.

The thermoplastic compositions described herein can be shaped, formed, or molded into a variety of articles. The thermoplastic compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like.

The compositions find particular utility in automotive applications, for example as instrument panels, overhead consoles, interior trim, center consoles, and the like.

Compositions as described herein have advantageous physical properties such as good impact resistance, low coefficient of thermal expansion, and low temperature ductility.

For the following non-limiting Examples, sample compositions were prepared from the following components:

| Component | Type | Source |
|---|---|---|
| Polycarbonate (PC-1) | BPA polycarbonate resin made by an interfacial process with an MVR at 300° C./1.2 kg, of 21.9-31.8 g/10 min. and a molecular weight of 20,000 to 25,000 (absolute PC molecular weight scale). | GE Advanced Materials |
| Polycarbonate (PC-2) | BPA polycarbonate resin made by a melt or interfacial process with an MVR at 300° C./1.2 kg, of 5.8-7.9 g/10 min and a molecular weight of 30,000 to 35,000 (absolute PC molecular weight scale). | GE Advanced Materials |
| Polycarbonate-polysiloxane copolymer | Polycarbonate-polysiloxane copolymer comprising units derived from BPA and units derived from formula (10), wherein n is 0, $R^2$ is propylene, R is methyl, D has an average value of about 50 and the copolymer has an absolute weight average molecular weight of about 28,000-32,000 g/mol and a dimethylsiloxane content of about 20 wt. % | GE Advanced Materials |
| Impact modifier | Rubber graft emulsion polymer comprising about 50% butadiene, 25% styrene-acrylonitrile grafted thereon and about 25% free styrene-acrylonitrile copolymer. | GE Advanced Materials |
| SAN | Styrene acrylonitrile copolymer comprising about 25 wt. % acrylonitrile and having a mol. wt. of about 65,000 on a polystyrene standard molecular weight scale and a MFI of 5.2-7.2 at 190° C./2.16 kg. | GE Advanced Materials |
| Talc | Particle size distribution wherein about 80% of the particles are sized 0.5 to 22 micrometers (µm) with a median particle size of about 2 to 3 µm. Where indicated, silane-treated talc was used. | Specialty Minerals, Inc., Bethlehem, PA |

In each of the examples, samples were prepared by melt extrusion on a Werner & Pfleider 25 mm twin screw extruder at a nominal melt temperature of 288° C., 25 inches (635 mm) of mercury vacuum, and 500 rpm. The extrudate was pelletized and dried at about 100° C. for about 4 hours. To make test specimens, the dried pellets were injection molded to form appropriate test samples.

EXAMPLE 1

A series of compositions was prepared as set forth in Table 1A, using the materials described above. In addition to the tabulated materials, each sample comprised about 0.6 wt. % additives (antioxidants and mold release agent). The polycarbonate was a combination of 30 wt. % PC-1 and 70 wt. % PC-2. Talc T and talc U had substantially the same particle size distribution, but talc T comprised silane-treated talc, whereas talc U comprised talc that was not silane-treated.

TABLE 1A

| Sample No. | Polycarbonate wt % | Polycarbonate-Polysiloxane wt % | SAN wt % | Impact Modifier wt % | Talc wt % | Additives wt % | Talc Type |
|---|---|---|---|---|---|---|---|
| 1 | 61.3 | 12.5 | 9.5 | 8 | 8 | 0.6 | T |
| 2 | 67.56 | 6.25 | 9.5 | 8 | 8 | 0.6 | T |
| 3 | 73.8 | 0 | 9.5 | 8 | 8 | 0.6 | U |
| 4 | 48.8 | 25 | 9.5 | 8 | 8 | 0.6 | T |
| 5 | 48.8 | 25 | 9.5 | 8 | 8 | 0.6 | T |
| 6 | 48.8 | 25 | 9.5 | 8 | 8 | 0.6 | U |
| 7 | 73.8 | 0 | 9.5 | 8 | 8 | 0.6 | U |
| 8 | 73.8 | 0 | 9.5 | 8 | 8 | 0.6 | T |
| 9 | 48.8 | 25 | 9.5 | 8 | 8 | 0.6 | U |
| 10 | 61.3 | 12.5 | 9.5 | 8 | 8 | 0.6 | U |
| 11 | 67.56 | 6.25 | 9.5 | 8 | 8 | 0.6 | U |

T = silane-treated talc
U = untreated talc

The compositions of Table 1A were tested for Izod impact strength and % ductility, multiaxial impact strength and %ductility, and tensile properties. The details of these tests and other tests used in examples that follow are known to those of ordinary skill in the art, and may be summarized as follows:

Izod Impact Strength ASTM D 256 (ISO 180) ('NII') is used to compare the impact resistances of plastic materials. The ISO designation reflects type of specimen and type of notch: ISO 180/1A means specimen type 1 and notch type A. ISO 180/1U means the same type 1 specimen, but clamped in a reversed way, (indicating unnotched). The ISO results are defined as the impact energy in joules used to break the test specimen, divided by the specimen area at the notch. Results are reported in kJ/m².

Instrumented Impact (dart impact or multiaxial "MA" impact) Energy is determined per ASTM D3763, determined using a 4-inch (10 cm) diameter, 3.2 millimeter (mm)-thick disk at a specified temperature, ½-inch (12.7 mm) diameter dart, and an impact velocity of 2.2 meters per second (m/s). Results are reported in Joules.

% Ductility is reported as the percentage of ten samples which, upon failure in the impact test, exhibited a ductile failure rather than rigid failure, the latter being characterized by cracking and the formation of shards. Ductility tends to decrease with temperature, and the ductile transition temperature is the temperature at which % ductility falls below 50%.

Tensile modulus, elongation to break, yield strength and tensile strength are all determined using a 4 mm thick molded tensile bar tested per ISO 527.

Coefficient of linear thermal expansion (CTE) was determined per ISO 11359-2, both across the direction of flow of the material in the mold ("cross-flow") and in the flow direction ("in-flow").

Spiral flow was determined at 288° C., 6 second injection, with 2.3 mm wall thickness.

Heat Deflection Temperature (HDT) is a relative measure of a material's ability to perform for a short time at elevated temperatures while supporting a load. The test measures the effect of temperature on stiffness: a standard test specimen is given a defined surface stress and the temperature is raised at a uniform rate. Heat Deflection Test (HDT) was determined per ISO 75Ae, using a flat, 4 mm thick bar, molded Tensile bar subjected to 1.8 Mpa and/or 0.45 Mpa, as indicated. Although not mentioned in the test standard, two acronyms are commonly used: HDT/A for a load of 1.80 Mpa, and HDT/B for a load of 0.45 Mpa.

The results of the tests on samples 1-11 are set forth in Tables 1B, 1C and 1D.

TABLE 1B

| Samples | Polycarbonate wt % | Polycarbonate-Polysiloxane wt % | Talc | IZOD-ISO (23° C.) Ductility % | IZOD-ISO (23° C.) Avg NII kJ/m² | IZOD-ISO (−30° C.) Ductility % | IZOD-ISO (−30° C.) Avg NII kJ/m² | IZOD-ISO (−40° C.) Ductility % | IZOD-ISO (−40° C.) Avg NII kJ/m² |
|---|---|---|---|---|---|---|---|---|---|
| 1 | 61.3 | 12.5 | T | 100 | 52.48 | 40 | 15.47 | 0 | 13.83 |
| 2 | 67.56 | 6.25 | T | 100 | 45.38 | 10 | 14.27 | 0 | 11.76 |
| 3 | 73.8 | 0 | U | 100 | 39.62 | 0 | 12.42 | 0 | 11.91 |
| 4 | 48.8 | 25 | T | 100 | 65.43 | 100 | 36.87 | 100 | 20.31 |
| 5 | 48.8 | 25 | T | 100 | 64.81 | 100 | 33.24 | 100 | 19.37 |
| 6 | 48.8 | 25 | U | 100 | 61.57 | 100 | 40.1 | 100 | 20.46 |

TABLE 1B-continued

| Samples | | | IZOD-ISO (23° C.) | | IZOD-ISO (−30° C.) | | IZOD-ISO (−40° C.) | |
|---|---|---|---|---|---|---|---|---|
| Polycarbonate wt % | Polycarbonate-Polysiloxane wt % | Talc | Ductility % | Avg NII kJ/m² | Ductility % | Avg NII kJ/m² | Ductility % | Avg NII kJ/m² |
| 7 | 73.8 | 0 | U | 100 | 36.21 | 0 | 13.3 | 0 | 11.03 |
| 8 | 73.8 | 0 | T | 100 | 38.8 | 0 | 13.12 | 0 | 11.36 |
| 9 | 48.8 | 25 | U | 100 | 63.79 | 100 | 40.72 | 100 | 23.08 |
| 10 | 61.3 | 12.5 | U | 100 | 53.51 | 100 | 20.41 | 0 | 14.53 |
| 11 | 67.56 | 6.25 | U | 100 | 44.22 | 10 | 13.73 | 0 | 12.32 |

T = silane-treated talc
U = untreated talc

The data of Table 1B shows that without polycarbonate-polysiloxane copolymer, a composition has no ductility at −30° C., and a composition containing about 1.25 wt. % siloxane (6.25 wt % of the polycarbonate-polysiloxane copolymer containing 20 wt. % siloxane) by weight has some ductility under Notched Izod impact (NII) testing conditions, regardless of the type of talc (see samples 2 and 11). Having some ductility, e.g., at least about 10%, is a valuable improvement over zero ductility.

At −40° C., ductility is lost even with 2.5 wt. % siloxane, but a sample comprising about 5 wt. % siloxane (e.g., about 25 wt. % polycarbonate-polysiloxane copolymer; see samples 4, 5 and 6) exhibited full ductility, indicating that the ductility transition temperature (meaning ductility of 50%) of −40° C. is attained with less than 5 wt. % siloxane, but more than 2.5 wt. %, in some embodiments, about 3.75 wt. % siloxane. Therefore, some embodiments comprise about 3.75 wt. % siloxane or more.

TABLE 1C

| | Samples | | | MAIMPACT (23° C.) | | MAIMPACT (−30° C.) | | MAIMPACT (−40° C.) | |
|---|---|---|---|---|---|---|---|---|---|
| No. | Polycarbonate wt % | Polycarbonate-Polysiloxane wt % | Talc Type | Ductility % | Avg Energy Joules | Ductility % | Avg Energy Joules | Ductility % | Avg Energy Joules |
| 1 | 61.3 | 12.5 | T | 100 | 53.4 | 40 | 56.5 | 20 | 50.8 |
| 2 | 67.56 | 6.25 | T | 100 | 54.5 | 0 | 60.1 | 0 | 54.4 |
| 3 | 73.8 | 0 | U | 100 | 57.7 | 0 | 57.5 | 0 | 53.8 |
| 4 | 48.8 | 25 | T | 100 | 46.5 | 100 | 49.2 | 80 | 51.7 |
| 5 | 48.8 | 25 | T | 100 | 49.2 | 100 | 52.2 | 100 | 52.2 |
| 6 | 48.8 | 25 | U | 100 | 48.4 | 100 | 51.7 | 60 | 51 |
| 7 | 73.8 | 0 | U | 100 | 53.4 | 0 | 57.6 | 0 | 52.1 |
| 8 | 73.8 | 0 | T | 100 | 57.6 | 0 | 59.3 | 0 | 53 |
| 9 | 48.8 | 25 | U | 100 | 46.9 | 100 | 50.3 | 60 | 44.2 |
| 10 | 61.3 | 12.5 | U | 100 | 50.0 | 20 | 57.5 | 0 | 48.9 |
| 11 | 67.56 | 6.25 | U | 100 | 53.3 | 20 | 59.1 | 0 | 51.7 |

T = silane-treated talc
U = untreated talc

A sharp increase in ductility is attained at −30° C. when the composition contains untreated talc and more than 1.25 wt. % siloxane, as illustrated by samples 10 and 11, which contain 1.25 wt. % and 2.5 wt. %, siloxane, respectively, and which show that such a composition having a ductile transition temperature of −30° C. under notched Izod conditions contains more than 1.25 wt. % siloxane, but may contain less than 2.5 wt. % siloxane, for example, about 2 wt. % siloxane. A composition with silane-treated talc and having a ductile transition temperature of −30° C. under notched Izod conditions may contain more than 2.5 wt. % siloxane but may contain less than 5 wt. % siloxane, in some embodiments, about 3.75 wt. % siloxane (compare sample 10 with samples 4 and 5). Therefore, some embodiments may comprise about 3.75 wt. % siloxane or more.

The data of Table 1C shows that without polycarbonate-polysiloxane copolymer, compositions have no ductility at −30° C. under multiaxial impact conditions, but a sample comprising about 1.25 wt. % siloxane and untreated talc (see sample 11) exhibits a significant improvement in ductility. In addition, a synergistic effect with silane-treated talc occurs with between 1.25 wt. % and 2.5 wt. % siloxane (compare sample 1 with sample 10). Compositions that comprised about 2.5 wt. % siloxane exhibited full ductility at −30° C. without regard to whether silane-treated filler is used when, just as under Notched Izod Impact conditions. At −40° C., the synergy with the silane-treated talc is again seen (compare sample 1 with 10 and samples 4 and 5 with 6 and 9).

TABLE 1D

| | Samples | | | | TENSILE | | | | | |
|---|---|---|---|---|---|---|---|---|---|---|
| | | Polycarbonate- | | | Yield | Break | Yield | Break | CTE | |
| No. | Polycarbonate Wt % | Polysiloxane wt % | Talc | Modulus MPa | Stress MPa | Stress Mpa | Strain % | Strain % | (cross-flow) um/(m-° C.) | (in-flow) um/(m-° C.) |
| 1 | 61.3 | 12.5 | T | 3093.2 | 49 | 52.6 | 3.92 | 92.2 | 79.56 | 47.2 |
| 2 | 67.56 | 6.25 | T | 3214.6 | 51 | 55.6 | 4.08 | 117.2 | 79.28 | 44.4 |
| 3 | 73.8 | 0 | U | 3221.2 | 53 | 60.2 | 4.32 | 126.6 | 76.38 | 45.5 |
| 4 | 48.8 | 25 | T | 2974.8 | 47 | 50.2 | 3.76 | 103.4 | 78.21 | 46.2 |
| 5 | 48.8 | 25 | T | 3098.6 | 48.6 | 52.6 | 3.76 | 101.6 | 75.63 | 52.4 |
| 6 | 48.8 | 25 | U | 2959.4 | 49 | 54 | 3.84 | 107.2 | 80.94 | 50.2 |
| 7 | 73.8 | 0 | U | 3036.4 | 50.6 | 57.2 | 4.1 | 115.2 | 80.98 | 46.1 |
| 8 | 73.8 | 0 | T | 3316 | 53.6 | 57.8 | 4.14 | 114.6 | 78.79 | 45.5 |
| 9 | 48.8 | 25 | U | 2870.8 | 47 | 50.6 | 3.84 | 103.6 | 75.22 | 45.6 |
| 10 | 61.3 | 12.5 | U | 3057.8 | 49 | 55.6 | 4.06 | 115.8 | 72.41 | 41.1 |
| 11 | 67.56 | 6.25 | U | 3157 | 51 | 58.4 | 4.2 | 121 | 71.37 | 43.6 |

T = silane-treated talc
U = untreated talc

The data of Table 1D shows that compositions as described herein exhibit tensile properties that are comparable to compositions that do not contain polycarbonate-polysiloxane copolymer.

EXAMPLE 2

In a particular embodiment, a thermoplastic composition may comprise about 56 wt. % polycarbonate, about 19.5 wt. % polycarbonate-polysiloxane copolymer containing 20 wt % siloxane (providing the composition with about 3.9 wt. % siloxane), about 4.5 wt. % ABS impact modifier and about 11.5% silane-treated talc. Based on an abalysis of other, similar compositions, such a composition is expected to have the following characteristics: Spiral Flow Length, 18.2 inches; HDT/B (0.45 MPa) of 129° C.; Notched Izod Impact Strength (NII) of 23.9 kJ/m$^2$ at 23° C. with 98.6% ductility; Tensile Modulus of 3418.5 MPa; Multiaxial impact of 44.6 kJ/m$^2$ with 94.7% ductility; CTE (in flow) of 48.6 micrometer/meter° C. (2.7×10$^{-5}$ in/in° F.); and viscosity at 5000/s of 56.2 Pa.s.

As evident from the examples herein, various embodiments of compositions described herein exhibit improved ductility at low temperature even with significant proportions of fillers, for example, at least 20% ductility, optionally at least 50% ductility or, in some embodiments, nearly 100% ductility at −30° C. or colder. Some embodiments show improved %ductility, for example, 80% or greater, at −30° C. or colder, for example, at −40° C. The combination of excellent impact strength, coefficient of thermal expansion and ductility of the above compositions containing polycarbonate and polycarbonate-polysiloxane copolymer, an aromatic vinyl copolymer and a mineral filler is unique. The compositions are therefore highly useful in the manufacture of articles such as automobile components.

As used herein, the terms "first," "second," and the like do not denote any order or importance, but rather are used to distinguish one element from another, and the terms "the", "a" and "an" do not denote a limitation of quantity, but rather denote the presence of at least one of the referenced item. All ranges disclosed herein for the same property or amount are inclusive of the endpoints and independently combinable. The modifier "about" used in connection with a quantity is inclusive of the stated value and has the meaning dictated by the context (e.g., includes the degree of error associated with measurement of the particular quantity). All cited patents, patent applications, and other references are incorporated herein by reference in their entirety.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermoplastic composition, comprising:
   a polycarbonate resin;
   a polycarbonate-polysiloxane copolymer;
   an aromatic vinyl copolymer;
   an impact modifier, wherein the impact modifier is a graft copolymer; and
   a mineral filler,
   wherein the composition has least about 40% ductility under multiaxial impact strength test conditions per ASTM D3763 at −30° C. determined using a 4-inch (10 cm) diameter, 3.2 millimeter (mm)-thick disk sample, ½-inch (12.7 mm) diameter dart, and an impact velocity of 2.2 meters per second (m/s).

2. The composition of claim 1, having at least 50% ductility under multiaxial impact strength test conditions per ASTM D3763 at −30° C. determined using a 4-inch (10 cm) diameter, 3.2 millimeter (mm)-thick disk sample, ½-inch (12.7 mm) diameter dart, and an impact velocity of 2.2 meters per second (m/s).

3. The composition of claim 1, wherein the mineral filler comprises a silane-treated mineral filler.

4. The composition of claim 1, wherein the mineral filler comprises silane-treated talc.

5. The composition of claim 1, wherein the impact modifier comprises a grafted rubber copolymer.

6. The composition of claim 1, wherein the impact modifier comprises ABS.

7. The composition of claim 1, wherein the aromatic vinyl copolymer comprises SAN.

8. The composition of claim 1, having full ductility under multiaxial impact test conditions per ASTM D3763 at −30° C. determined using a 4-inch (10 cm) diameter, 3.2 millimeter (mm)-thick disk sample, ½-inch (12.7 mm) diameter dart, and an impact velocity of 2.2 meters per second (m/s).

9. The composition of claim 1, having at least 50% ductility under multiaxial impact test conditions per ASTM D3763 at −40° C. determined using a 4-inch (10 cm) diameter, 3.2 millimeter (mm)-thick disk sample, ½-inch (12.7 mm) diameter dart, and an impact velocity of 2.2 meters per second (m/s).

10. The composition of claim 1, wherein the composition is substantially free of phosphate and sulfonate flame retardants.

11. The composition of claim 1, consisting essentially of the polycarbonate resin, the polycarbonate-polysiloxane copolymer, the aromatic vinyl copolymer, the impact modifier and the mineral filler.

12. The composition of claim 1, comprising about 2 wt. % to about 25 wt. % aromatic vinyl copolymer, about 0.1 wt. % to about 15 wt. % impact modifier and about 2 wt. % to about 20 wt. % mineral filler, by weight of the composition.

13. The composition of claim 12, having at least 40% ductility under multiaxial impact test conditions per ASTM D3763 at −30° C. determined using a 4-inch (10 cm) diameter, 3.2 millimeter (mm)-thick disk sample, ½-inch (12.7 mm) diameter dart, and an impact velocity of 2.2 meters per second (m/s).

14. The composition of claim 12, wherein the mineral filler comprises a silane-treated mineral filler.

15. The composition of claim 12, wherein the mineral filler comprises silane-treated talc.

16. A thermoplastic composition, comprising:
a polycarbonate resin;
a polycarbonate-polysiloxane copolymer in an amount sufficient to provide at least about 2.5 wt. % siloxane by weight of the composition;
an aromatic vinyl copolymer comprising SAN;
an impact modifier comprising ABS; and
a mineral filler.

17. The composition of claim 16, wherein the mineral filler comprises silane-treated mineral filler.

18. The composition of claim 16, comprising about 2 wt. to about 25 wt. % to about 25 wt. % SAN, about 0.1 wt. % to about 15 wt. % ABS and about 2 wt. % to about 20 wt. % mineral filler.

19. A method for making a thermoplastic composition, comprising combining, by weight of the composition, polycarbonate resin, a polycarbonate-polysiloxane copolymer, an aromatic vinyl copolymer, an impact modifier, wherein the impact modifier is a graft copolymer, and a mineral filler, wherein the composition has at least 40% ductility under multiaxial impact strength test conditions per ASTM D3763 at −30° C.

20. The method of claim 19, wherein the composition has at least 50% ductility under multiaxial impact test conditions per ASTM D3763 at −30° C. determined using a 4-inch (10 cm) diameter, 3.2 millimeter (mm)-thick disk sample, ½-inch (12.7 mm) diameter dart, and an impact velocity of 2.2 meters per second (m/s).

21. An article comprising the composition of claim 1.

22. A method for forming an article, comprising molding, shaping, extruding or forming the composition of claim 1 to form the article.

* * * * *